United States Patent [19]

Gregorich et al.

[11] Patent Number: 5,033,711
[45] Date of Patent: Jul. 23, 1991

[54] UNIVERSAL BRACKET FOR FANS

[75] Inventors: Daniel A. Gregorich; Frank E. Breining, both of Jackson; Conard A. Moulton, Horton; Stanley J. Riske, both of Horton, all of Mich.

[73] Assignee: Airmaster Fan Company, Jackson, Mich.

[21] Appl. No.: 533,089

[22] Filed: Jun. 4, 1990

[51] Int. Cl.⁵ ............................................. F16M 3/00
[52] U.S. Cl. ................................. 248/664; 248/278; 248/558
[58] Field of Search .............. 248/664, 666, 667, 674, 248/278, 282, 284, 289.1, 291, 558

[56] References Cited

U.S. PATENT DOCUMENTS

| | | | |
|---|---|---|---|
| 1,266,367 | 5/1918 | Wilson | 248/284 |
| 3,565,372 | 2/1971 | Jones et al. | 248/677 X |
| 3,910,535 | 10/1975 | Ohnaka | 248/664 |
| 4,039,129 | 8/1977 | Berkeland et al. | 248/664 |
| 4,247,067 | 1/1981 | Smith | 248/667 X |
| 4,651,966 | 3/1987 | Suzuki | 248/674 |

Primary Examiner—Ramon O. Ramirez
Attorney, Agent, or Firm—Beaman & Beaman

[57] ABSTRACT

The invention pertains to a universal bracket for mounting a fan motor assembly upon a support structure. The universal bracket consists of a plurality of low cost fabricated components and incorporates an optional dual construction whereby the components may be assembled to form a construction adapted for ceiling mounting or, in the alternative, to form a construction adapted for wall mounting. The components permit quick and easy assembly and disassembly of the universal bracket, and, in either construction, a swivel relationship exists between the assembled components permitting limited universal angular adjustment of the supported fan motor assembly.

11 Claims, 1 Drawing Sheet

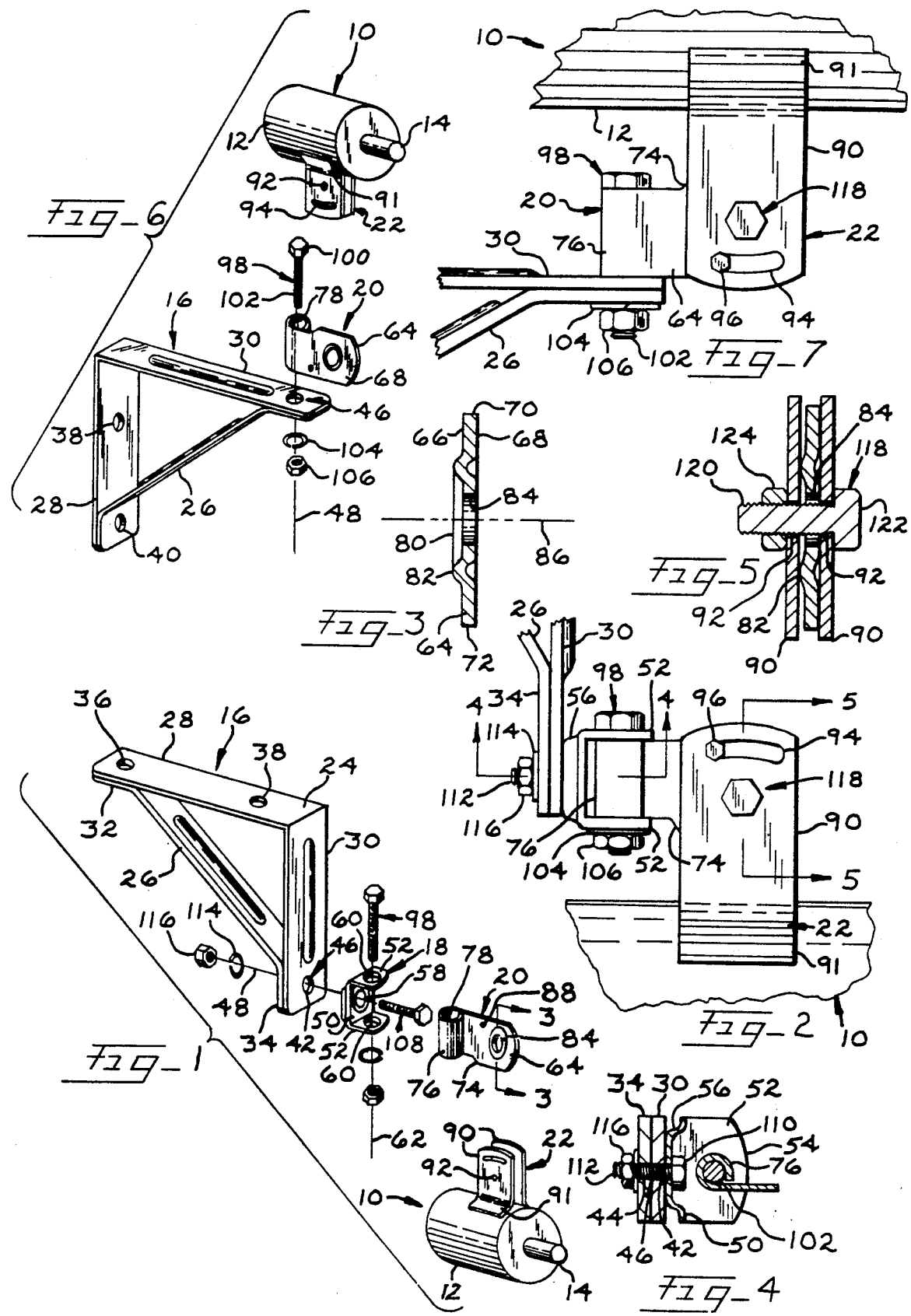

UNIVERSAL BRACKET FOR FANS

BACKGROUND OF THE INVENTION

Air circulation fans are often mounted at elevated locations whereby a bracket is mounted upon a wall, ceiling, beam or other similar support structure and the fan is supported by the bracket. Typically, such a bracket consists of two or more components whereby one component is adapted to be mounted upon a structure, and another component is affixed to the fan, and each component is pivotally assembled to another component such that an articulated or swivel relationship exists between the components permitting angular adjustment of the fan.

Often, the components are manufactured of low cost fabrication techniques such as by stamped sheet material and bending processes which reduces the overall costs of such brackets, and holes formed in the components align with one another to receive a pivot pin to pivotally mount the components together. The pivot pin may be in the form of a threaded bolt adapted to threadedly receive a nut to maintain assembly of the components, and the nuts may be sufficiently tightened to lock the angular position of the components with respect to one another to maintain the fan in the desired position.

While such brackets are relatively quick and easy to assemble the construction of such brackets only permit the bracket to be assembled for one type of mounting. For instance, the components of such brackets are either constructed to be assembled to form a bracket for mounting upon a wall type structure or to form a bracket adapted to be mounted upon a ceiling type structure. Also, such brackets only permit swiveling about one axis and, thus, universal angular adjustment of the fan is not possible.

It is an object of the invention to provide a bracket for mounting a fan motor assembly upon a support structure wherein the bracket consist of a plurality of components and incorporates an optional dual construction whereby the components may be assembled to form a construction adapted for ceiling mounting or, in the alternative, to form a construction adapted for wall mounting.

Another object of the invention is to provide a bracket which incorporates an optional dual construction for mounting a fan to either a wall or ceiling type support structure wherein the bracket consists of a plurality of components pivotally mounted to one another such that a swivel relationship exists between the components permitting limited universal angular adjustment of the fan.

A further object of the invention is to provide a universal bracket having a plurality of components which incorporates an optional dual construction for mounting a fan to a either a wall or ceiling type support structure wherein the components permit quick and easy assembly such that the bracket may be readily assembled in either form, and wherein the components are pivotally mounted to one another by a pivot pin in the form of nut and bolt assemblies which permit tightening for locking the angular position of the components with respect to one another and permit the bracket to be easily disassembled and reassembled in the alternative construction.

Yet a further object of the invention is to provide a universal bracket for mounting a fan to a support structure which incorporates an optional dual construction wherein the bracket consists of a plurality of components which incorporate a simple construction of economical manufacture yet, a dependable and durable bracket is provided.

In the practice of the invention the universal bracket is adapted to mount a fan motor assembly upon a support structure and permit limited universal angular adjustment of the fan motor assembly with respect to the support structure. The universal bracket consists of a plurality of components and incorporates an optional dual construction whereby the components may be assembled to form a construction adapted to be mounted upon a substantially horizontally extending support structure such as a ceiling or, in the alternative, to form a construction adapted to be mounted upon a substantially vertically extending support structure such as a wall.

The primary components of the universal bracket include a base, a hinge, a swivel plate, and a mounting bracket. The base comprises an L-shaped member having a pair of legs disposed at right angles to one another and a cross bar which extends between the outer ends of the leg. One of the base's legs is provided with a pair of spaced holes to receive fasteners to mount the base to the associated structure and the other leg is provided with a hole adjacent its outer end which defines a pivot pin receiving hole for pivotally mounting either the hinge or swivel plate to the base depending on the particular construction being assembled.

The hinge, which is only utilized when the bracket is assembled in the wall mount construction, is of a U-shaped configuration including a central region and a pair of parallel spaced legs extending in a common direction from the central region. The central region is provided with a recessed portion having a hole extending therethrough adapted to align with the pivot receiving hole in the base to receive a pivot pin to pivotally mount the hinge to the base and the legs are provided with aligned holes adapted to receive a pivot pin to pivotally mount the swivel plate to the hinge.

The swivel plate comprises a generally flat body including a pair of spaced sides joined along spaced edges. At one end the body is rolled back defining a pivot pin receiving loop of sufficient axial length to be received intermediate the hinge's legs in alignment with the holes, and the loop is also adapted to align with the pivot receiving hole in the base. An annular ridge is defined upon the body formed of the material of the swivel plate including a convex surface extending from the general plane of the body. A pivot receiving hole extends through the body concentric with the annular ridge having an axis extending normal to the axial length of the loop. The body's hole is adapted to receive a pivot pin to pivotally mount the mounting plate to the swivel plate, and another hole extends through the body adapted to receive an adjustment bolt.

The mounting plate includes a pair of substantially parallel spaced legs adapted to receive the swivel plate's body. The legs are provided with aligned holes adjacent one end adapted to align with the pivot receiving hole in the swivel plate's body to receive a pivot pin to pivotally mount the mounting plate to the swivel plate. At the other end the legs are adapted to be affixed to a fan motor assembly to be supported by the bracket. The mounting plate's legs are also provided with aligned arcuate slots concentrically related to the pivot receiving hole which are adapted to align with the adjustment bolt receiving hole in the swivel plate to receive an adjustment bolt to lock the angular position and limit the angular displacement of the swivel and mounting plates with respect to one another.

To assemble the universal bracket in the ceiling mount construction the pivot receiving hole in the hinge's central portion is aligned with the pivot pin receiving hole in the base's leg and a pivot pin in the form of a threaded bolt is passed therethrough. The head of the bolt is received in the hinges recessed portion and a lock washer and nut are received on the threaded end of the bolt whereby the nut is tightened to maintain assembly of the base and hinge. The swivel plate's loop is located intermediate the hinge's legs in alignment with the leg's holes and a pivot pin in the form of a threaded bolt is passed through the aligned holes and loop to pivotally mount the swivel plate to the hinge. A nut is threaded on the end of the bolt to maintain assembly of the swivel plate and hinge. The mounting plate is located on the swivel plate such the holes in the mounting plate's legs align with the pivot receiving hole in the swivel plate and a pivot pin in the form of a bolt is passed therethrough and a nut is threadedly received on the bolt to pivotally mount the mounting plate to the swivel plate.

To assemble the universal bracket in the wall mount construction the swivel plate is pivotally mounted directly to the base whereby the loop is aligned with the pivot receiving hole in the base and a pivot pin in the form a threaded bolt is passed therethrough and a nut is threaded on the bolt to maintain assembly of the components. The mounting plate is assembled to the swivel plate in the same manner as in the ceiling mount construction.

In both the wall and ceiling mount constructions, the base may be secured to the support structure by fasteners passed through the holes in the one leg of the base to draw the leg into firm engagement with the structure while the other leg upon which the components are assembled extends normal to the general plane of the structure. The ceiling mount construction permits the fan assembly to be supported in a spaced relation below the structure while the wall mount construction permits the fan to be supported in a spaced position away from the wall. In both constructions the swivel relationship which exists between the components permits limited universal angular adjustment of the fan permitting the fan to be easily adjusted to the desired position.

The primary components provide quick assembly and disassembly of the universal bracket and the optional dual construction feature extends the useability of the universal bracket. In either construction the nuts associated with the pivot bolts may be sufficiently tightened to lock the angular position of the bracket to prevent angular displacement of the fan during operation due to vibration. Also, because the components incorporate a simple construction and are fabricated of economical manufacturing processes a low cost bracket is provided which is dependable and durable.

BRIEF DESCRIPTION OF THE DRAWINGS

The aforementioned objects and advantages of the invention will be appreciated from the following description and accompanying drawings wherein:

FIG. 1 is an exploded perspective, reduced scale view illustrating the primary components of the universal bracket of the invention prior to being assembled in the ceiling mount construction and a typical fan motor assembly adapted to be mounted upon the universal bracket, FIG. 2 is an elevational, partial view illustrating the universal bracket as assembled in the ceiling mount construction supporting the fan motor assembly, FIG. 3 is an elevational, sectional view of the swivel plate taken along Section 3—3 of FIG. 1, FIG. 4 is an elevational, sectional view taken along Section 4—4 of FIG. 2, FIG. 5 is an elevational, sectional view taken along Section 5—5 of FIG. 2, FIG. 6 is an exploded perspective, reduced scale view illustrating the primary components of the universal bracket prior to being assembled in the wall mount construction and the fan motor assembly adapted to be mounted upon the bracket, and FIG. 7 is an elevational, partial view illustrating the universal bracket as assembled in the wall mount construction supporting the fan motor assembly.

DESCRIPTION OF THE PREFERRED EMBODIMENT

In a typical application the universal bracket of the invention is utilized to mount a fan motor assembly upon a support structure and permit limited universal angular adjustment of the fan motor assembly with respect to the associated structure. The universal bracket consists of a plurality of components and incorporates an optional dual construction whereby the components may be assembled to form a construction adapted to be mounted upon a substantially horizontally extending support structure such as a ceiling or, in the alternative, to form a construction adapted to be mounted upon a substantially vertically extending support structure such as a wall.

With reference to the drawings, a typical fan motor assembly adapted to be supported by the universal bracket is generally indicated at 10. The fan assembly 10 includes a cylindrical casing 12 which encases a motor and supports a motor driveshaft 14 upon which a conventional fan blade, not shown, may be attached in the normal manner while fan blade guards, not shown, may be mounted on the motor casing.

The primary components of the universal bracket are illustrated in FIG. 1 in an exploded view prior to be assembled in the ceiling mount construction as later described and best appreciated in FIGS. 2, 4 and 5 wherein the base is indicated at 16, the hinge at 18, the swivel plate at 20, and the mounting plate at 22 which is affixed at one end to the fan motor casing 12. These components, except for the hinge 18, which is not required, are also illustrated in FIG. 6 in an exploded view prior to be assembled in the wall mount construction in a manner later described and best appreciated in FIG. 7.

The base 16 consist of an L-shaped member 24 and a cross bar 26, each formed of stamped steel plate and bending processes. The member 24 includes a pair of legs 28 and 30 disposed at right angles to one another, and the cross bar 26 includes a pair of ends 32 and 34 which are angled to form abutments adapted to engage the outer ends of the legs 28 and 30, respectively. A pair of holes 36 and 38 are formed in the leg 28, and the hole 36 is adapted to align with a hole 40 formed in the angled end 32, FIG. 6. A hole 42 is formed in the outer end of the leg 30 and is adapted to align with a hole 44 formed in the angled end 34, FIG. 4. The aligned holes 36 and 40 and the hole 38 are adapted to receive fasteners to mount the base 16 to a support structure. The aligned holes 42 and 44 define a pivot pin receiving hole 46, having an axis 48, adapted to receive a pivot pin to mount the hinge 18 or swivel plate 20 to the base 16. Preferably, the cross bar 26 is preassembled to the member 24 by spot welding but may be secured to the base by the same fasteners utilized to mount the base to the structure and by the pivot pin adapted to be received in the hole 46.

The hinge 18 comprises a generally U-shaped configuration formed of steel including a central region 50 and a pair of substantially parallel legs 52 extending in a common direction therefrom. The legs 52 have arcuate end portions 54, and the central region 50 includes a circumferential recessed portion 56 extending outwardly in the opposite direction than that of the legs 52. A concentrically aligned hole 58 extends through the recessed portion 56 adapted to receive a pivot pin to pivotally mount the hinge 18 to the base 16. The legs 52 are provided with aligned holes 60 adapted to receive a pivot pin to pivotally mount the swivel plate 20 to the hinge 18. The aligned holes 60 have a common axis 62 extending normal to the axis of the hole 58 which aligns with the axis 48 when the hinge 18 is mounted to the base 16.

The swivel plate 20 is formed of a generally flat piece of stamped metal and includes a generally flat body 64 having spaced sides 66 and 68, FIG. 3, joined at edges 70 and 72. The edge 72 is provided with a notch 74, and the swivel plate is rolled back over at the end 76 to form a pivot pin receiving loop 78. The loop 78 has an axial length sufficient to be received intermediate the legs 52 of the hinge 18 whereby the loop 78 is adapted to axially align with the holes 60 to receive a pivot pin to pivotally mount the swivel plate to the hinge 18. The loop 78 is also adapted to align with the pivot receiving hole 46 in the base 16 to receive a pivot pin to pivotally mount the swivel plate directly to the base in the wall mount construction.

As will be best appreciated in FIG. 3, an annular ridge 80 is defined upon the body 64 and includes a convex surface 82 which axially extends from the general plane of the body 64 in the direction of the side 66. The ridge 80 is formed of the material of the swivel plate 20, and a pivot receiving hole 84 extends through the body 64 concentric to the annular ridge 80 adapted to receive a pivot pin to pivotally mount the mounting plate 22 to the swivel plate 20. The hole 84 has an axis 86, FIG. 3, which extends normal to the length of the pivot receiving loop 78. Another hole 88 extends through the body 64.

The mounting plate 22 includes a pair of substantially parallel spaced legs 90 which include bent ends 91 affixed to the fan motor casing 12, such as by welding, bolts, or rivets. The legs 90 are sufficiently spaced to receive the body 64 whereby aligned holes 92 formed in the legs 90 align with the hole 84 to receive a pivot pin to pivotally mount the mounting plate 22 to the swivel plate 20. Aligned arcuate slots 94 are also formed in the legs 90 concentrically related to the holes 92. The slots 94 are adapted to align with the hole 88 in the swivel plate to receive an adjustment bolt 96, FIGS. 2 and 7.

The pivot pin adapted to be received in the loop 78 is in the form of a bolt 98 having a head 100 and a threaded shaft 102. The shaft 102 is adapted to loosely extend through either the pivot receiving hole 46 or the holes 60 in the hinge to pivotally mount the swivel plate 20 directly to the hinge or to the base 16. A lock washer 104 is adapted to be received over the shaft 102 and the nut 106 is adapted to be threadedly received on the shaft 102 to maintain assembly of the components. The pivot pin utilized to pivotally mount the hinge 18 to the base is in the form of a bolt 108 having a head 110 and a threaded shaft 112 adapted to extend through the aligned holes 58 and 46 of the hinge and swivel base, respectively, to pivotally mount the same together. A lock washer 114 and threaded nut 116 are adapted to received on the shaft 112 whereby the nut has threads adapted to threadedly mate with the threaded shaft 112.

To assemble the universal bracket in the ceiling mount construction the hole 58 of the hinge 18 is aligned with the pivot receiving hole 46 in the base and the bolt 108 is passed through the aligned holes whereby the head 110 is of sufficient dimension to be received within the recess 56, FIG. 4. The washer 114 and nut 116 are located on the shaft 112 and the nut 116 is tightened to the extent necessary to maintain assembly of the hinge 18 and base 16. Thus, a swivel relationship exist between the hinge and base about the axis 48. The swivel plate's loop 78 is located intermediate the hinge's legs 52 and aligns with the holes 60 to receive the bolt 98. The lock washer 104 and nut 106 are received on the shaft 102 and the nut is sufficiently tightened to maintain assembly of the hinge and swivel plate. Thus, a swivel relationship exists between the swivel plate and hinge about the axis 62. As the swivel plate swivels with respect to the hinge 18 the notch 74 rides over the arcuate edge 54 of the respective leg.

Upon assembling the swivel plate 20 and hinge 18, the base may be mounted to a substantially horizontally extending support structure, not shown, such as a ceiling or beam whereby fasteners, not shown, extend through the aligned holes 36 and 40 and the hole 38 to mount the base 16 to the structure whereby the leg 28 is secured in a firm engagement with the structure. The other leg 30 extends normal to the plane of the structure in a downward direction, FIGS. 1 and 2. The mounting plate 22 is located on the swivel plate 20 such that the body 64 is received between the legs 90 and the holes 92 align with the hole 84 to receive a bolt 118 having a threaded shaft 120 and a head 122 as best illustrated in FIG. 5. A nut 124 is threadedly received on the shaft 122 to pivotally mount the mounting plate 22 and fan motor assembly 10 to the swivel plate 20. The slots 94 align with the hole 80 and the bolt 96 is passed through the aligned slots and hole to threadedly receive a nut, not shown.

As the nut 124 is tightened the legs 90 are drawn toward each other compressing against the ridge's surface 82 which causes slight deformation of the ridge 80, FIG. 5. Due to the natural resilience of the ridge 80 tending to assume its normal position of FIG. 3, significant frictional forces are created between the swivel plate 20 and mounting plate 22 which prevents angular displacement between the swivel plate and mounting plate due to the vibration of the fan motor during operation. However, such frictional forces may be overcome by the applying forces directly to the fan motor assembly 10 to permit the fan to be pointed in the desired direction. The swivel plate and mounting plate swivel with respect to each other about the axis 86, and the bolt 96 limits the angular displacement of the components relative to one another by engaging either end of the slot 94. The bolt 96 and associated nut may also be sufficiently tightened to lock the angular position of the mounting plate with respect to the swivel plate.

In this ceiling mount construction the swivel relationship between the base and hinge, the hinge and swivel plate, and the swivel plate and the mounting plate about the axes 48, 62, and 86, respectively, permits limited universal angular adjustment of the fan motor assembly 10 such that the fan may be pointed in the desired direction. If desired, the nut 116 may be sufficiently tightened to lock the angular position of the hinge with respect to the base.

To assemble the universal bracket in the wall mount construction, as illustrated in FIGS. 6 and 7, the same primary components are utilized as in the ceiling mount construction of FIG. 2 except for the hinge 22. The swivel plate is pivotally mounted directly to the base 16 such that the loop 78 aligns with the hole 46 and the notch 74 extends away from the leg 30, FIG. 7. The bolt 98 is passed through the aligned hole 46 and loop 78 and the lock washer 104 and nut 106 are received on the shaft 102 to pivotally mount the swivel plate with respect to the base permitting a swivel relationship between the components about the axis 48. The mounting plate 22 is pivotally mounted upon the swivel plate 20 in the same manner as in the ceiling mount construction.

In this wall mount construction the universal bracket is utilized to mount the fan upon a substantially vertically extending support structure such as a wall or vertically extending beam, not shown. The base is mounted to the structure by fasteners passed through the aligned holes 36 and 40 and the hole 38 to mount the base to the structure whereby the leg 28 is secured in a firm engagement with structure while the leg 30 extends normal to the plane of the structure. The swivel relationship between the base and swivel plate and the swivel plate and mounting plate about the axes 48 and 86, respectively, permit limited universal angular adjustment of the fan motor with respect to the support structure permitting the fan to be pointed in the desired direction.

Both the wall and ceiling mount constructions may be quickly disassembled simply by removing the nuts from the associated bolts and separating the components, and the components are readily available to be quickly reassembled in either construction. The simple construction of the components provides for low cost manufacturing and permits quick and easy angular adjustment yet, a universal bracket of relatively high strength construction is maintained.

It is to be understood that either construction may be utilized in conjunction with a support structure which neither lies in a horizontal nor vertical plane. Also, the universal bracket is not limited to applications for mounting a fan motor but may also be utilized to support other members as well.

It is to be appreciated that various modifications to the inventive concepts may be apparent to those skilled in the art without departing from the spirit and scope of the invention.

We claim:

1. A universal bracket for mounting a member upon a support structure and permitting limited universal angular adjustment of the member with respect to the structure, comprising, in combination, a base, said base having means for receiving fasteners to mount said base to a support structure, a swivel plate having first and second pivot receiving means defined thereupon, said first pivot receiving means being of an elongated tubular configuration having an axis and said second pivot receiving means comprising a hole defined in said swivel plate having an axis substantially perpendicular to said tubular configuration axis, a mounting plate having means for supporting a member to be mounted, third pivot receiving means defined upon said mounting plate, said second and third pivot receiving means being adapted to align to receive a first pivot to pivotally mount said mounting plate upon said swivel plate permitting swiveling of said mounting plate and the associated member with respect to said swivel plate about a first axis, and fourth pivot receiving means associated with said base adapted to align with said first pivot receiving means to receive a second pivot to pivotally mount said swivel plate with respect to said base permitting swiveling of said swivel plate with respect to said base about a second axis substantially perpendicular to said first axis and thereby permitting swiveling of said mounting plate and the associated member with respect to said base about said first and second axes.

2. A universal bracket for mounting a member upon a support structure and permitting limited universal angular adjustment of the member with respect to the structure, comprising, in combination, a base, said base having means for receiving fasteners to mount said base to a support structure, a swivel plate having first and second pivot receiving means defined thereupon, a mounting plate having means for supporting a member to be mounted, third pivot receiving means defined upon said mounting plate, said second and third pivot receiving means being adapted to align to receive a first pivot to pivotally mount said mounting plate upon said swivel plate permitting swiveling of said mounting plate and the associated member with respect to said swivel plate about a first axis, and fourth pivot receiving means associated with said base adapted to align with said first pivot receiving means to receive a second pivot to pivotally mount said swivel plate with respect to said base permitting swiveling of said swivel plate with respect to said base about a second axis and thereby permitting swiveling of said mounting plate and the associated member with respect to said base about said first and second axes, said swivel plate comprising a generally flat body including first and second sides, said body being rolled back over at one end defining a loop, said loop defining said first pivot receiving means, a first hole extending through said body between said first and second sides defining said second pivot receiving means.

3. In a universal bracket as in claim 2, said mounting plate comprising of pair of parallel spaced legs each having an outer end and an inner end and being sufficiently spaced to receive said swivel plate's body, said leg's inner ends being adapted to be affixed to the associated member to be mounted, a pair of aligned holes defined in said mounting plate's legs adjacent said leg's outer ends, said aligned holes defining said third pivot receiving means.

4. In a universal bracket as in claim 3, an annular ridge defined upon said swivel plate's body homogeneously formed of the material of said swivel plate having a convex surface extending outwardly from said first side, said annular ridge being concentrically related to said second pivot receiving means and being adapted to engage one of said mounting plate's legs in a frictional relation.

5. In a universal bracket as in claim 3, said first and second pivots comprising a bolt having a head and a threaded shaft adapted to threadedly receive a threaded nut.

6. In a universal bracket as in claim 4, a second hole defined in said swivel plate's body, a pair of aligned arcuate slots defined in said mounting plates legs concentrically related to said third pivot receiving means, said slots being adapted to align with said second hole to receive a pin member which cooperates with said slots to limit the extent of the angular displacement of said mounting plate with respect to said swivel plate.

7. In a universal bracket as in claim 2, said fourth pivot receiving means comprising a hole defined in said base.

8. In a universal bracket as in claim 3, said bracket including a hinge, said hinge being pivotally mounted upon said base having swivel movement with respect to said base about a third axis, said fourth pivot receiving means being defined upon said hinge whereby said mounting plate and the associated member are permitted to swivel with respect to said base about said first, second, and third axes.

9. In a universal bracket as in claim 8, said hinge being of a U-shaped configuration including a central region and a pair of parallel spaced legs extending in a common direction therefrom, said central region including a recess, a pivot receiving hole extending through said recess, said pivot receiving hole being adapted to axially align with a hole defined in said base along said third axis to receive a third pivot to pivotally mount said hinge to said base, said hinge's legs being sufficiently spaced to receive said swivel plate's loop and having a pair of aligned holes defining said fourth pivot receiving means.

10. In a universal bracket as in claim 9, said first, second and third pivots comprising a bolt having a head and a threaded shaft adapted to threadedly receive a nut, said recess being of sufficient dimension to receive said third pivot's head.

11. In a universal bracket as in claim 9, a second hole defined in said swivel plate's body, a pair of aligned arcuate slots defined in said mounting plates legs concentrically related to said third pivot receiving means, said slots being adapted to align with said second hole to receive a pin member which cooperates with said slots to limit the extent of the angular displacement of the mounting plate with respect to said swivel plate.

* * * * *